(12) United States Patent
Alkasimi

(10) Patent No.: US 9,355,396 B1
(45) Date of Patent: May 31, 2016

(54) SYSTEM AND METHOD FOR PROVIDING GOODS AND SERVICES DURING VEHICULAR TRAVEL BY CORRELATING FIRST AND SECOND IDENTIFICATIONS OF A SEAT ON A VEHICLE USING A COMPUTER SERVER POSITIONED ON THE VEHICLE AND A NEAR FIELD COMMUNICATION (NFC) TAG POSITIONED ON THE VEHICLE AND ASSOCIATED WITH THE SEAT

(71) Applicant: American Airlines, Inc., DFW Airport, TX (US)

(72) Inventor: Hyder Alkasimi, Flower Mound, TX (US)

(73) Assignee: AMERICAN AIRLINES, INC., DFW Airport, TX (US)

( * ) Notice: Subject to any disclaimer, the term of this patent is extended or adjusted under 35 U.S.C. 154(b) by 347 days.

(21) Appl. No.: 13/735,578

(22) Filed: Jan. 7, 2013

(51) Int. Cl.
*G06Q 30/06* (2012.01)
*G06Q 20/22* (2012.01)
*H04L 29/08* (2006.01)

(52) U.S. Cl.
CPC ............ *G06Q 20/22* (2013.01); *G06Q 30/0601* (2013.01); *H04L 67/125* (2013.01)

(58) Field of Classification Search
CPC .............. G06Q 30/0601; G06Q 20/22; G06Q 30/0631; H04L 67/125; H04L 67/02; H04L 67/12; H04L 69/329; B64D 9/00; Y02T 50/46
USPC ............ 705/26.1, 39, 26.7; 455/414.1, 414.2, 455/414.3, 418
See application file for complete search history.

(56) References Cited

U.S. PATENT DOCUMENTS

| | | | |
|---|---|---|---|
| 6,782,392 B1 * | 8/2004 | Weinberger ............ | G06Q 30/06 |
| 8,170,535 B1 * | 5/2012 | Lopes et al. ................ | 455/414.3 |
| 8,369,848 B1 | 2/2013 | Lopes et al. | |
| 2007/0130591 A1 * | 6/2007 | Brady ..................... | H04L 29/06 |
| | | | 725/76 |
| 2009/0121085 A1 * | 5/2009 | Hettwer ................... | B64D 9/00 |
| | | | 244/137.1 |
| 2011/0210820 A1 * | 9/2011 | Talty et al. ...................... | 340/5.8 |
| 2013/0005336 A1 * | 1/2013 | Ayotte et al. ............... | 455/435.1 |
| 2013/0179336 A1 * | 7/2013 | Lyons et al. ..................... | 705/39 |
| 2013/0303143 A1 * | 11/2013 | Schrader et al. .............. | 455/418 |
| 2014/0073300 A1 * | 3/2014 | Leeder et al. ................. | 455/416 |

* cited by examiner

*Primary Examiner* — Yogesh C Garg
(74) *Attorney, Agent, or Firm* — Haynes and Boone, LLP

(57) ABSTRACT

A system and method according to which goods and services are provided during vehicular travel. In an exemplary embodiment, the vehicle is an airplane operated by a commercial airline.

3 Claims, 11 Drawing Sheets

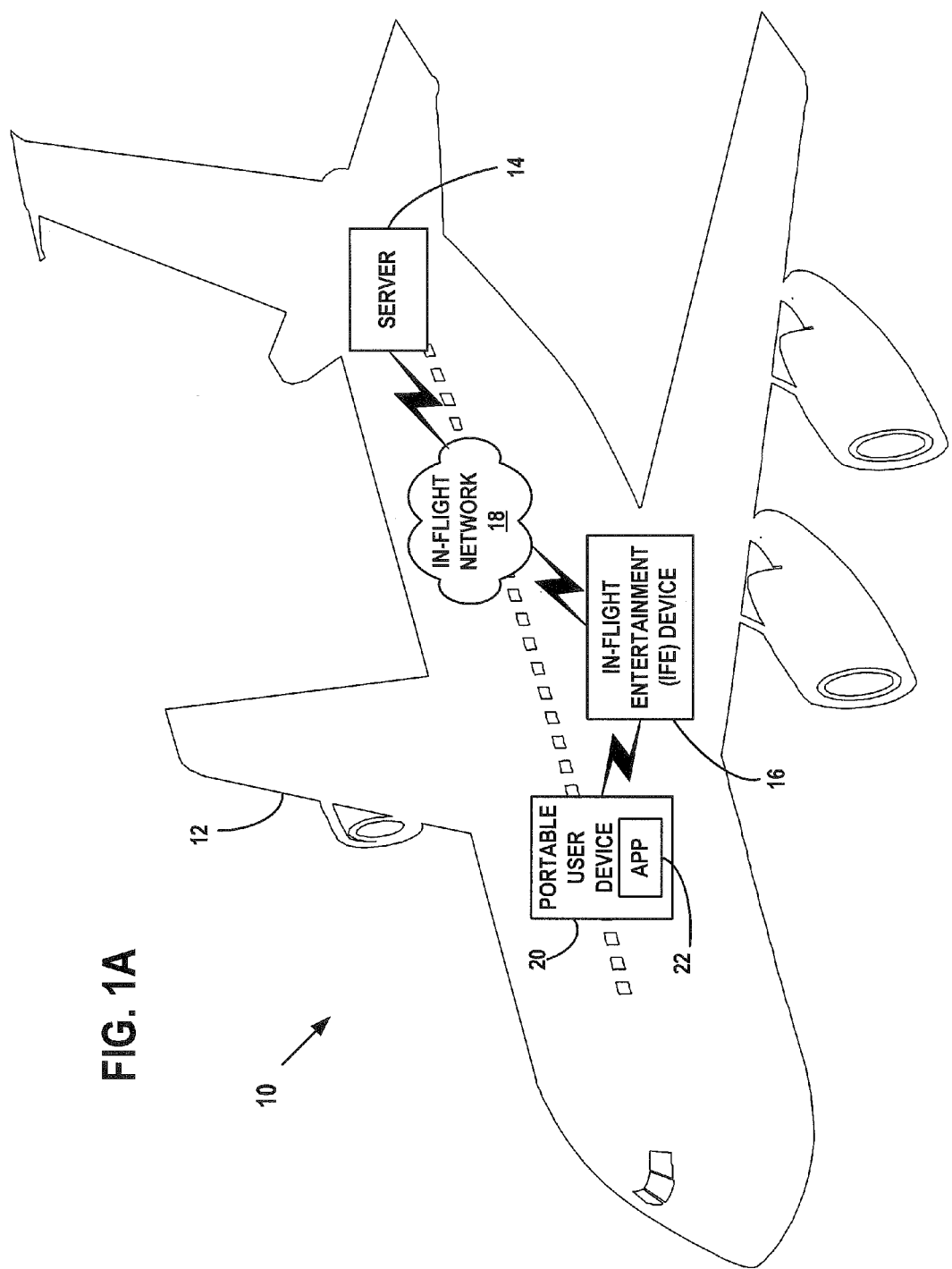

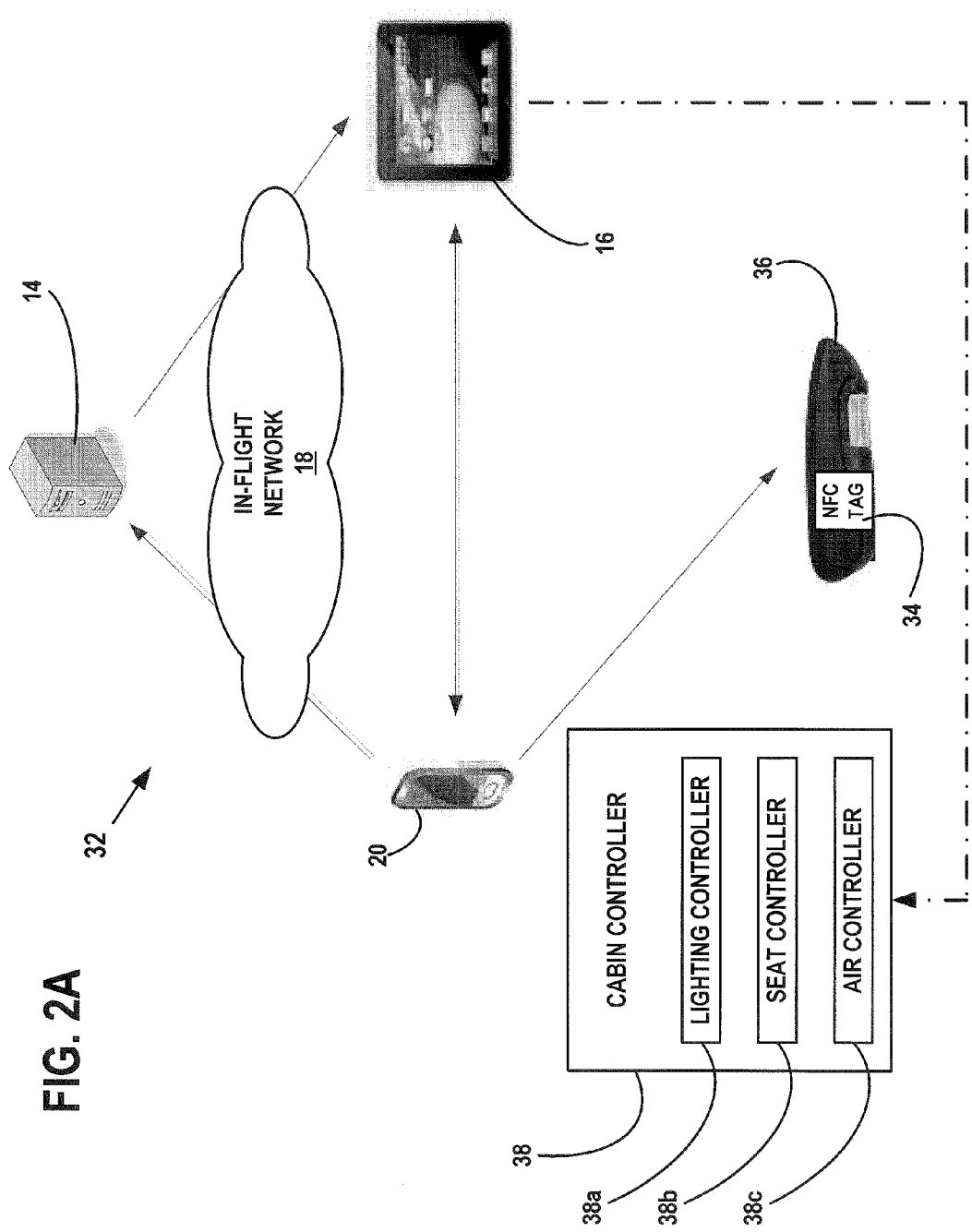

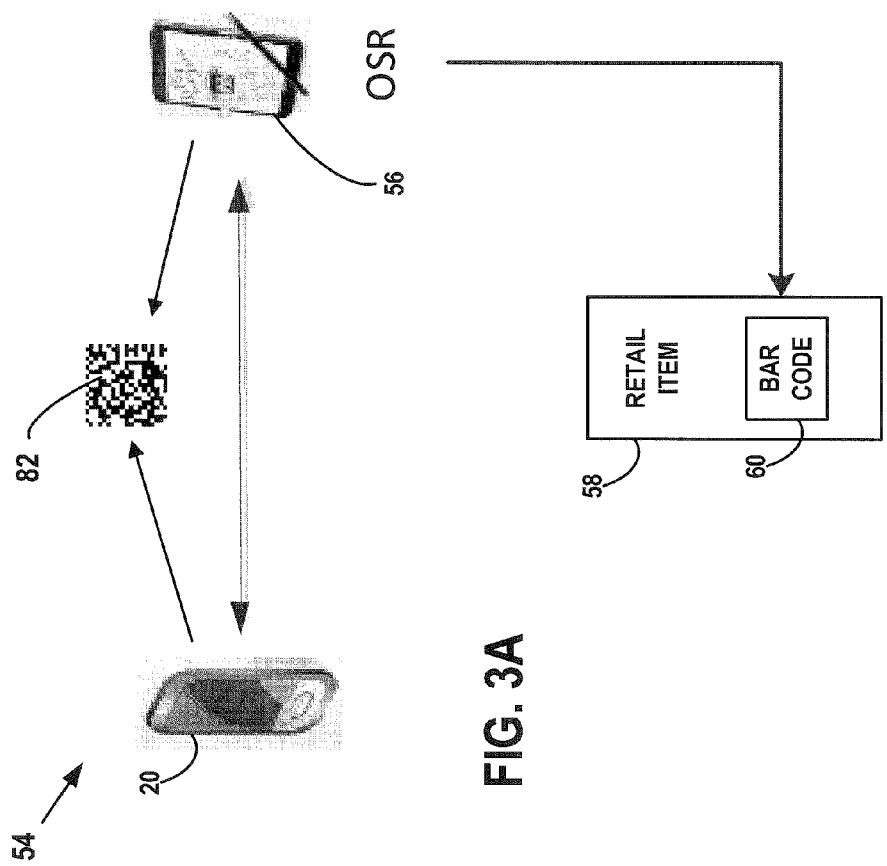

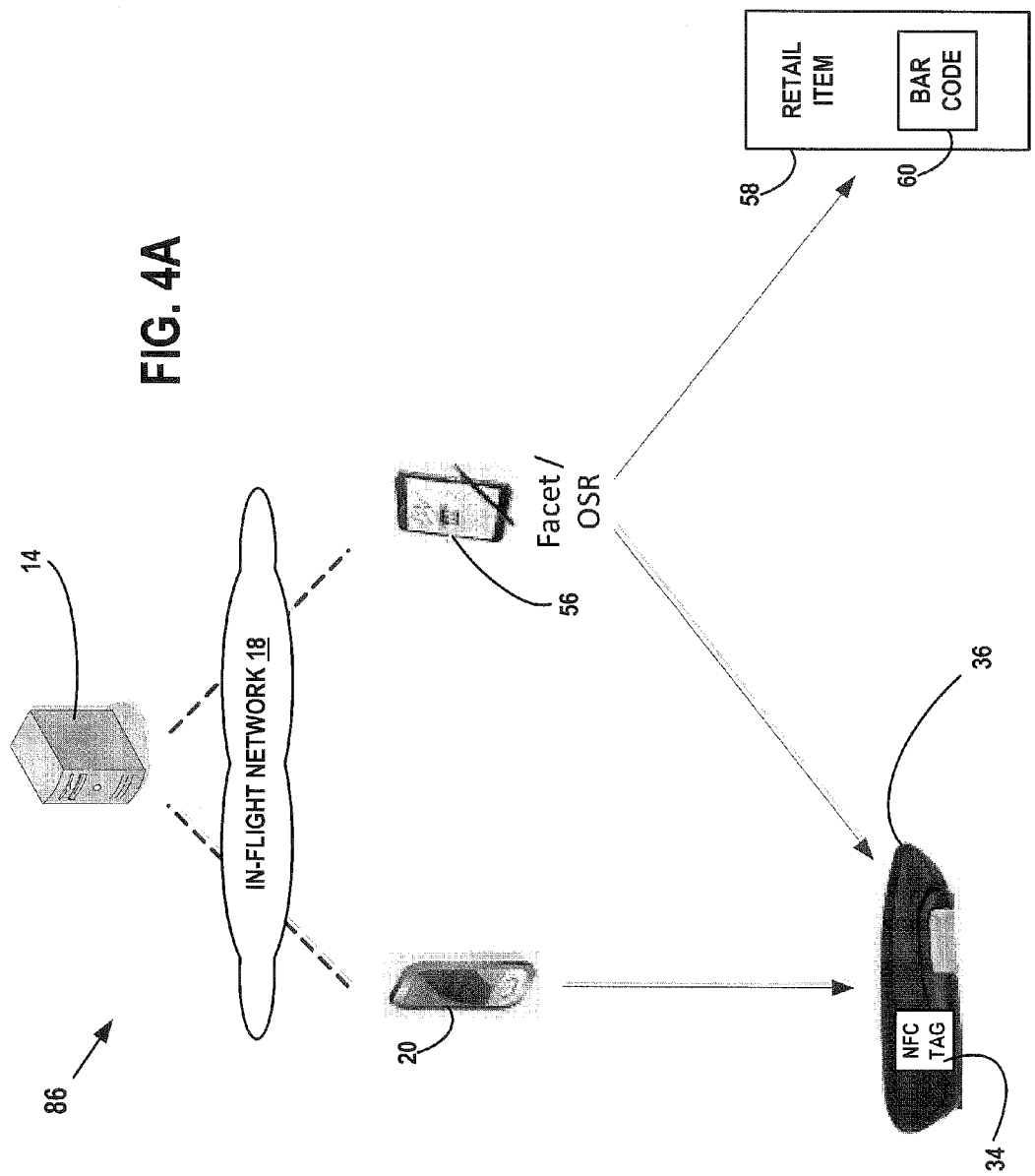

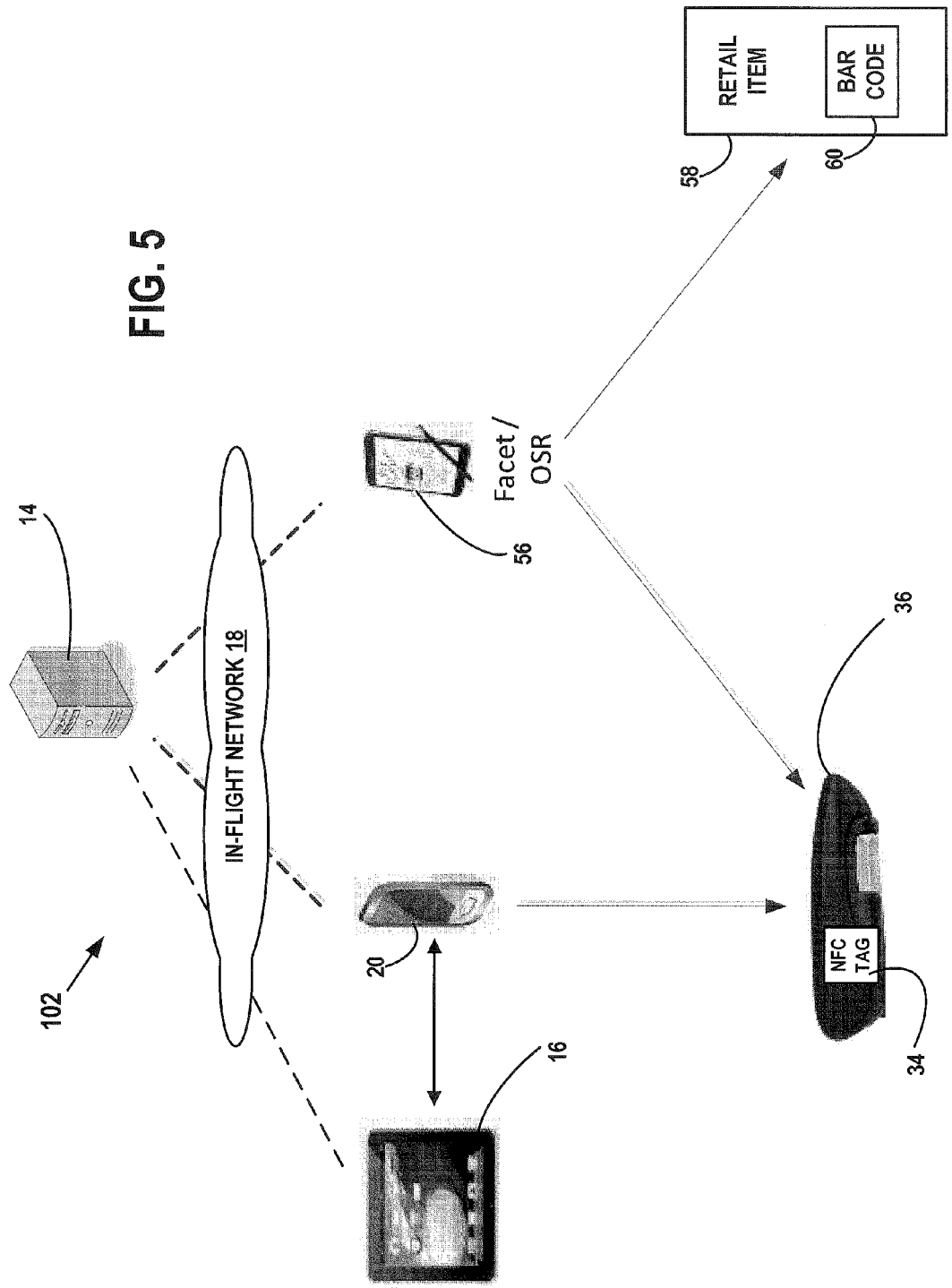

SYSTEM AND METHOD FOR PROVIDING GOODS AND SERVICES DURING VEHICULAR TRAVEL BY CORRELATING FIRST AND SECOND IDENTIFICATIONS OF A SEAT ON A VEHICLE USING A COMPUTER SERVER POSITIONED ON THE VEHICLE AND A NEAR FIELD COMMUNICATION (NFC) TAG POSITIONED ON THE VEHICLE AND ASSOCIATED WITH THE SEAT

BACKGROUND

The present disclosure relates in general to providing goods and services during vehicular travel. Such vehicular travel may include, for example, travel on an airplane operated by a commercial airline. A passenger may purchase retail items, such as food, beverages, gifts or other merchandise, on the airplane. However, the purchase of such retail items may entail relatively slow, cumbersome and inconvenient processes. Additionally, during travel on the airplane, the passenger may take advantage of information or entertainment services. However, the content of, or the control over, such services may not be to the passenger's liking, or may not be adequately customizable, resulting in a relatively impersonal experience for the passenger. Therefore, what is needed is a method, system or apparatus that addresses one or more of the foregoing issues, among others.

BRIEF DESCRIPTION OF THE DRAWINGS

FIG. 1A is a diagrammatic illustration of a system according to an exemplary embodiment.

FIG. 2A is a diagrammatic illustration of a system according to an exemplary embodiment.

FIG. 3A is a diagrammatic illustration of a system according to an exemplary embodiment.

FIG. 3B is a diagrammatic illustration of a component of the system of FIG. 3A, according to an exemplary embodiment.

FIG. 4A is a diagrammatic illustration of a system according to an exemplary embodiment.

FIG. 5 is a diagrammatic illustration of a system according to an exemplary embodiment.

DETAILED DESCRIPTION

Figure 1B:
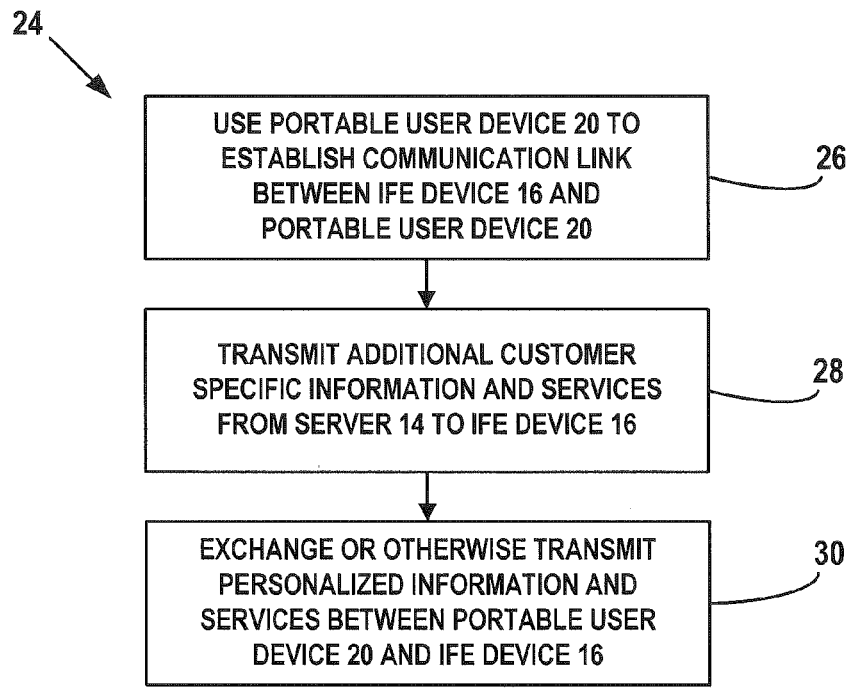
FIG. 1B is a flow chart illustration of a method of operating the system of FIG. 1A, according to an exemplary embodiment.

In an exemplary embodiment, as illustrated in FIG. 1A, a system is generally referred to by the reference numeral 10 and includes a vehicle, such as an airplane 12, and a computer server 14 located on the airplane 12. In an exemplary embodiment, the airplane 12 is operated by a commercial airline. An electronic device, such as an in-flight entertainment (IFE) device 16, is operably coupled to, and in communication with, the computer server 14 via an in-flight network 18. An electronic device, such as a portable user device 20, is adapted to communicate with the IFE device 16. In several exemplary embodiments, the portable user device 20 is adapted to communicate with the IFE device 16 via near field communication (NFC), Bluetooth, infrared, proximity inference via, for example, Global Positioning System (GPS) or triangulation, or other indirect technologies. In several exemplary embodiments, the portable user device 20 is adapted to communicate with the IFE device 16 via 802.11b, 802.11g, 802.11a, ultra wideband (UWB), multiple band rates, or other suitable technologies. A mobile application (or "app") 22 is stored on the portable user device 20.

In an exemplary embodiment, the computer server 14 is a web application server, which in several exemplary embodiments includes and/or executes one or more web-based programs, Intranet-based programs, and/or any combination thereof. In several exemplary embodiments, the computer server 14 is a computing device that includes a computer readable medium on which content, as well as computer programs or instructions, are stored, and one or more processors that execute the computer programs or instructions to, for example, provide the content to the IFE device 16 or the portable user device 20, as will be described in further detail below. The content stored in the computer server 14 may include safety videos, music, games, movies, television programs, books, magazines, catalogs, audio programming, such as songs, audio books, and other audio materials, arrival videos, maps, operational applications, recreational applications, and/or any other types of information or content. In addition, the content may include current information, which is information that changes based on current events, such as weather, news, and sports scores.

In an exemplary embodiment, the IFE device 16 may be one or more computing devices such as personal computers, personal digital assistants, cellular devices, mobile telephones, wireless devices, handheld devices, laptops, audio devices, tablet computers, game consoles, cameras, and/or any other suitable devices. In one embodiment, the IFE device 16 may be supplied by a passenger of the airplane 12. In another embodiment, the IFE device 16 may be supplied by the operator of the airplane 12. In an additional embodiment, the IFE device 16 may be removably connectable to the airplane 12, such as by temporarily attaching the IFE device 16 to a passenger seat or a passenger table in the airplane 12. In a further embodiment, the IFE device 16 may be permanently installed in the airplane 12.

In an exemplary embodiment, the network 18 includes the Internet, one or more local area networks, one or more wide area networks, one or more cellular networks, one or more wireless networks, one or more voice networks, one or more data networks, Ethernet, one or more communication systems, and/or any combination thereof. In several exemplary embodiments, the network 18 includes one or more access points, each of which may be a router, wireless access point, or any other device or module, or a combination thereof, which enables communication between electronic devices, including between the computer server 14 and the IFE device 16.

In an exemplary embodiment, the portable user device 20 is a handheld or otherwise portable user device which is carried onto the airplane 12 by a user who is a passenger on the airplane 12. In several exemplary embodiments, the portable user device 20 is a smartphone such as, for example, an iPhone® by Apple Inc. The portable user device 20 includes a computer readable medium in which the application 22 is stored, and a processor that executes the application 22.

In an exemplary embodiment, a user identifier associated with the application 22, and/or the portable user device 20, may be stored on the computer readable medium of the portable user device 20 on which the application 22 is stored. In an exemplary embodiment, the user identifier is assigned and stored on the portable user device 20 in response to the user using the application 22 to enroll in a club or program maintained by the commercial airline, such as a frequent flyer program, thereby opening a frequent flyer account. In an exemplary embodiment, the user identifier is assigned and stored on the portable user device 20 in response to the user using the application 22 to initially login into the frequent flyer program and access his or her frequent flyer account. In an exemplary embodiment, the user identifier includes one or more name-value pairs, one of which is a user identification (user ID).

In several exemplary embodiments, at least one of the application 22, the computer server 14 and the IFE device 16 includes a computer program including a plurality of instructions, data, and/or any combination thereof. In an exemplary embodiment, the application program 22 is an application written in, for example, HyperText Markup Language (HTML), Cascading Style Sheets (CSS), JavaScript, Extensible Markup Language (XML), asynchronous JavaScript and XML (Ajax), and/or any combination thereof. In an exemplary embodiment, the application 22 is a web-based application written in, for example, Java or Adobe Flex, which pulls real-time information from the computer server 14, automatically refreshing with latest information every, for example, 45 seconds. In an exemplary embodiment, the IFE device 16 is a thin client and the computer server 14 controls at least a portion of the operation of the IFE device 16. In an exemplary embodiment, the IFE device 16 is a thick client, and/or functions as both a thin client and a thick client.

In several exemplary embodiments, one or more of the components of the system 10 and/or content stored therein, and/or any combination thereof, are part of, and/or are distributed throughout, the system 10 and/or one or more other components thereof. In several exemplary embodiments, the platforms of the system 10 are identical, different, or vary with respect to equipment, peripherals, hardware architecture and/or specifications, software architecture and/or specifications, and/or any combination thereof.

In an exemplary embodiment, as illustrated in FIG. 1B with continuing reference to FIG. 1A, a method of operating the system 10 is generally referred to by the reference numeral 24. The method 24 includes at step 26 using the portable user device 20 to establish a communication link between the IFE device 16 and the portable user device 20.

At step 28, additional data specific to the user, such as customer specific information and services, are transmitted from the computer server 14 to the IFE device 16. In an exemplary embodiment, at the step 28, the user identifier stored on the portable user device 20 is transmitted to the IFE device 16, which then transmits the user identifier to the computer server 14, which, in turn, selects and/or generates customer specific information and services at least partially based on stored data associated with the user identifier; the customer specific information and services are transmitted to the IFE device 16. In an exemplary embodiment, at the step 28, data or content (personalized or otherwise) may be transmitted from the computer server 14 to the IFE device 16 for viewing by, and/or interaction with, the passenger on the airplane 12.

At step 30, before, during or after the step 28, personalized information and services are exchanged or otherwise transmitted between the portable user device 20 and the IFE device 16. At the step 30, in an exemplary embodiment, the size of the output display of the IFE device 16 is greater than the size of the output display of the portable user device 20. Personalized content and media stored on the portable user device 20 may be streamed or otherwise transmitted from the portable user device 20 to the IFE device 16 so that the content and media may be viewed using the IFE device 16, thereby providing a more convenient viewing format for viewing digital media and thus a more enjoyable and personalized experience inside the airplane 12. In an exemplary embodiment, the portable user device 20 supplies at least a portion of the content displayed on the IFE device 16, and controls the display of the content on the IFE device 16. In an exemplary embodiment, the computer server 14 supplies at least a portion of the content displayed on the IFE device 16. In an exemplary embodiment, one or both of the portable user device 20 and the IFE device 16 control the display of the content on the IFE device 16.

Figure 1C:
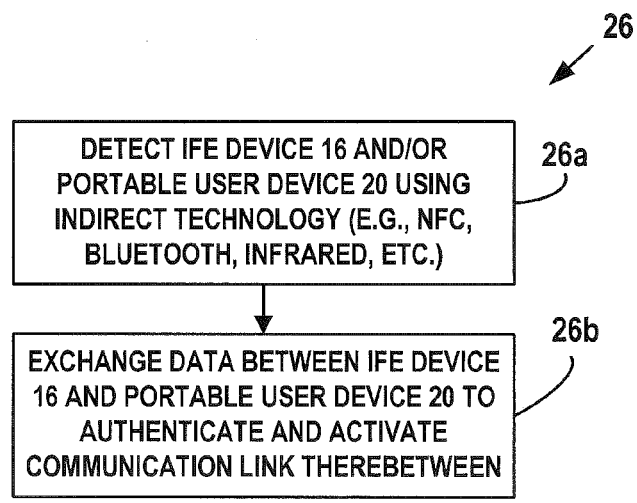
FIG. 1C is a flow chart illustration of a step of the method of FIG. 1B, according to an exemplary embodiment.

In an exemplary embodiment, as illustrated in FIG. 1C with continuing reference to FIGS. 1A and 1B, the step 26 includes at step 26*a* detecting the portable user device 20 and/or the IFE device 16 using indirect technology such as, for example, near field communication (NFC), Bluetooth, infrared, proximity inference via, for example, Global Positioning System (GPS) or triangulation, or other indirect technologies. At step 26*b* authentication data is exchanged between the portable user device 20 and the IFE device 16 to authenticate and activate the communication link between the portable user device 20 and the IFE device 16. In an exemplary embodiment, the user of the portable user device 20 is a passenger on the airplane 12, and carries the portable user device 20 onto the airplane 12. The user takes his or her seat on the airplane 12, and "bumps" the portable user device 20 against the IFE device 16, which is located at or near the user/passenger's seat. As a result, the portable user device 20 and/or the IFE device 16 is or are detected at the step 24*a*, and at the step 24*b* authentication data is exchanged between the devices 16 and 20 to authenticate and activate the communication link therebetween. At the step 24*a*, in an exemplary embodiment, the execution of the application 22 on the portable user device 20 permits the user to "bump" the portable user device 20 against the IFE device 16.

Figure 1D:
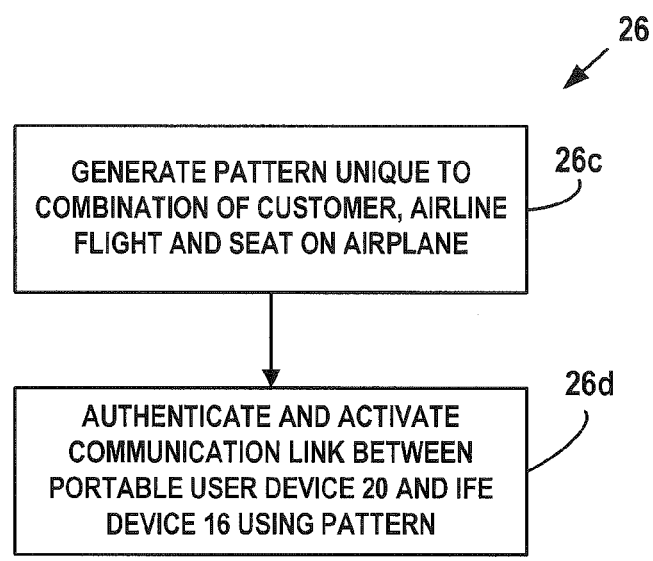
FIG. 1D is a flow chart illustration of a step of the method of FIG. 1B, according to another exemplary embodiment.

In an exemplary embodiment, as illustrated in FIG. 1D with continuing reference to FIGS. 1A, 1B and 1C, instead of the steps 26*a* and 26*b*, the step 26 includes a step 26*c*, at which a pattern is generated on the portable user device 20. At step 26*d*, the communication link between the portable user device 20 and the IFE device 16 is authenticated and activated using the pattern generated at the step 26*c* by, for example, scanning or otherwise reading the pattern using the IFE device 16 so that the pattern is received on the IFE device 16.

In several exemplary embodiments, the pattern generated at the step 26*c* is specific or unique to a customer, flight and seat combination for a particular airline flight to be carried out by the airplane 12. In an exemplary embodiment, at the step 26*c*, the application 22 generates the pattern on the portable user device 20. The IFE device 16 is associated with the seat of the user/passenger, being located at or near the user/passenger's seat (e.g., being connected to the back of the seat immediately in front of the user/passenger's seat). Since the IFE device 16 is associated with the seat, the pattern generated at the step 26c is specific or unique to the combination of the customer, flight and seat.

In an exemplary embodiment, the pattern generated at the step 26c is a dynamic pattern that changes over time. In an exemplary embodiment, instead of being specific to a customer, flight and seat combination, the pattern generated at the step 26c is specific to a customer and a time combination.

In an exemplary embodiment, as illustrated in FIG. 2A with continuing reference to FIGS. 1A, 1B, 1C and 1D, a system is generally referred to by the reference numeral 32 and includes the components of the system 10, which components are given the same reference numerals. Although not shown in FIG. 2A, the system 32 includes the airplane 12, in which the remainder of the components of the system 32 are located or positioned either permanently or temporarily. As shown in FIG. 2A, the portable user device 20 is operably coupled to, and in communication with, the computer server 14 via the network 18. The system 32 further includes an NFC tag 34, which is connected to a seat arm 36. The seat arm 36 is the arm for the seat of the user of the portable user device 20 (who is also a passenger on the airplane 12). The NFC tag 34 includes a seat identifier that identifies the seat of which the seat arm 36 is a part. In several exemplary embodiments, instead of the NFC tag 34, another type of smart or data tag may be connected to the seat arm 36. In several exemplary embodiments, instead of being connected to the seat arm 36, the NFC tag 34 may be connected to, for example, another portion of the seat of which the seat arm 36 is a part, to a tray associated with the seat of which the seat arm 36 is a part, to the back of the seat immediately in front of the seat of which the seat arm 36 is a part, or to a cabin wall or surface above or proximate to the seat of which the seat arm 36 is a part.

A cabin controller 38 is operably coupled to, and in communication with, the IFE device 16. The cabin controller 38 is adapted to control at least the seat of the user/passenger (for which the seat arm 36 is an arm), and the environment in the immediate vicinity of the seat. The cabin controller 38 includes a lighting controller 38a, a seat controller 38b, and an air controller 38c. The lighting controller 38a controls the overhead lighting above the seat for which the seat arm 36 is an arm. In an exemplary embodiment, the lighting controller 38a controls the brightness of the overhead lighting, and/or the direction of the overhead lighting. The seat controller 38b controls one or more positions of the seat of which the seat arm 36 is a part. The air controller 38c controls the air nozzle above the seat of which the seat arm 36 is a part. In an exemplary embodiment, the air controller 38c controls the amount of air exiting the air nozzle above the seat, and/or the direction of the air exiting the air nozzle above the seat. In an exemplary embodiment, the IFE device 16 is in communication with the cabin controller 38 via Ethernet, the network 18, or a combination thereof. In an exemplary embodiment, the cabin controller 38 controls the lighting, seat position, and air for a plurality of seats on the airplane 12. In an exemplary embodiment, the cabin controller 38 controls the lighting, seat position, and air only for the seat of which the seat arm 36 is a part. In an exemplary embodiment, instead of, or in addition to the IFE device 16, the cabin controller 38 is operably coupled to, and in communication with, the computer server 14 via the network 18. In an exemplary embodiment, the controllers 38a, 38b and 38c may be combined into a single controller, which is, or is a part of, the cabin controller 38.

Figure 2B:
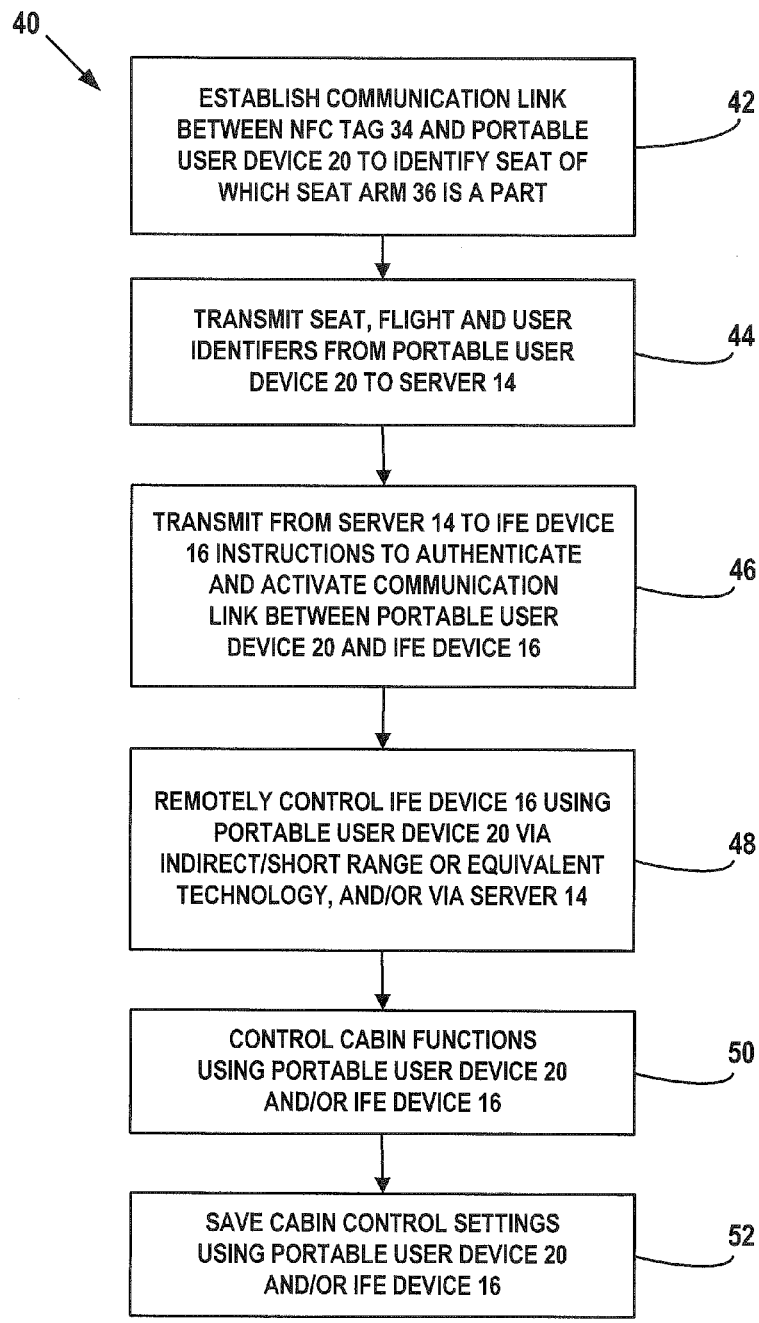
FIG. 2B is a flow chart illustration of a method of operating the system of FIG. 2A, according to an exemplary embodiment.

In an exemplary embodiment, as illustrated in FIG. 2B with continuing reference to FIG. 2A, a method of operating the system 32 is generally referred to by the reference numeral 40.

The method 40 includes at step 42 establishing a communication link with the NFC tag 34 using the portable user device 20 to identify the seat of which the seat arm 36 is a part. In an exemplary embodiment, at the step 42, the application 22 is opened, executed, run or otherwise started up on the portable user device 20. The application 22 is then used to establish a communication link with the NFC tag 34 by placing the portable user device 20 in relatively close physical proximity to the NFC tag 34, thereby establishing the communication link and reading the seat identifier of the NFC tag 34.

At step 44, the seat identifier read by the application 22 at the step 42 is transmitted from the portable user device 20 to the computer server 14 via the network 18. Additionally, at the step 44, the above-described user identifier is transmitted from the portable user device 20 to the computer server 14 via the network 18. The application 22 associates the user identifier with the user/passenger's airline flight to be taken using the airplane 12, and stores on the portable user device 20 a flight identifier that identifiers the airline flight. In addition to the seat and user identifiers, at the step 44 this flight identifier is also transmitted from the portable user device 20 to the computer server 14 via the network 18. In several exemplary embodiments, the application 22 operates to transmit the seat, user and flight identifiers to the computer server 14.

At step 46, in response to the receipt of the seat, flight and user identifiers at the step 44, the computer server 14 transmits to the IFE device 16 data, such as instructions to authenticate and activate a communication link between the portable user device 20 and the IFE device 16.

At step 48, the portable user device 20 remotely controls the IFE device 16 via indirect/short range or equivalent technology, and/or via the computer server 14. In an exemplary embodiment, at the step 48, the portable user device 20 remotely controls the IFE device 16 by communicating with the computer server 14 via the network 18, which in turn communicates with the IFE device 16 via the network 18.

In an exemplary embodiment, during the step 48, personalized information and services are exchanged or otherwise transmitted between the portable user device 20 and the IFE device 16. Personalized content and media stored on the portable user device 20 may be transmitted from the portable user device 20 to the IFE device 16 so that the content and media may be viewed using the IFE device 16, thereby providing a more convenient viewing format for viewing digital media and thus a more enjoyable and personalized experience inside the airplane 12. In an exemplary embodiment, the portable user device 20 supplies at least a portion of the content displayed on the IFE device 16, and controls the display of the content on the IFE device 16. In an exemplary embodiment, during the step 48, the computer server 14 supplies at least a portion of the content displayed on the IFE device 16. In an exemplary embodiment, during the step 48, one or both of the portable user device 20 and the IFE device 16 control the display of the content on the IFE device 16.

Before, during or after the step 48, at step 50 the portable user device 20 and/or the IFE device 16 control cabin functions associated with the seat of which the seat arm 36 is a part. Such cabin functions may include the brightness of the overhead lighting, the direction of the overhead lighting, one or more positions of the seat of which the seat arm 36 is a part, the amount of air exiting the air nozzle above the seat, the direction of the air exiting the air nozzle above the seat, and/or any combination thereof. In an exemplary embodiment, during the step 50, the portable user device 20 communicates with the lighting controller 38a, the seat controller 38b and/or the air controller 38c to control any combination of the foregoing cabin functions. In several exemplary embodiments, the portable user device 20 may so communicate via at least the IFE device 16, via at least the computer server 14, via at least the computer server 14 and the IFE device 16, via the at least the IFE device 16 and the network 18, via at least the computer server 14 and the network 18, or via at least the computer server 14, the network 18 and the IFE device 16. In an exemplary embodiment, at step 52, cabin control settings corresponding to the foregoing cabin functions may be saved as preferred settings on the portable user device 12, the IFE device 16, the computer server 14, another computer readable medium, or any combination thereof. In an exemplary embodiment, during the airline flight carried out using the airplane 12, the saved cabin control settings can be transmitted to the controllers 38a, 38b, 38c or any combination thereof, to set the cabin functions to the user/passenger's preferred settings. In an exemplary embodiment, during a subsequent airline flight on which the user of the portable user device 20 is a passenger, the saved cabin control settings can be transmitted from the portable user device 20 to the controllers 38a, 38b and 38c, or equivalents thereof if an airplane other than the airplane 12 is being used, to set the cabin functions to the user/passenger's preferred settings. In several exemplary embodiments, the operation of the system 32, or the execution of the method 40, allows the user to save cabin settings and control them using the portable user device 20 and/or the IFE device 16.

In several exemplary embodiments, the operation of any of the systems 10 and 32, or the execution of any of the methods 24 and 40, provides several functions including, but not limited to, the following: providing the user of the portable user device 20, who is a passenger on the airplane 12, a more personalized cabin experience; simplifying the authentication and activation of the IFE device 16 by allowing the user to use the portable user device 20 for identification; providing for activation of the IFE device 16 using the portable user device 20; providing for the remote control of at least the IFE device 16 using at least the portable user device 20; and projecting or otherwise displaying content on the portable user device 20 to the onboard IFE device 16.

In several exemplary embodiments, the operation of any of the systems 10 and 32, or the execution of any of the methods 24 and 40, occurs before, during or after the airplane 12 has traveled from a departure location to an arrival location, thereby completing a travel leg or airline flight.

In an exemplary embodiment, as illustrated in FIGS. 3A and 3B with continuing reference to FIGS. 1A, 1B, 1C, 1D, 2A and 2B, a system is generally referred to by the reference numeral 54 and includes the portable user device 20 and the application 22 stored therein. An electronic device, such as an onboard sales recorder (OSR) device 56, is adapted to communicate with the portable user device 20, as well as a retail item 58 that includes a barcode 60. In an exemplary embodiment, the OSR device 56 is NFC-enabled. In several exemplary embodiments, the portable user device 20 is adapted to communicate with the OSR device 56 via near field communication (NFC), Bluetooth, infrared, proximity inference via, for example, Global Positioning System (GPS) or triangulation, or other indirect technologies. As shown in FIG. 3B, the OSR device 56 includes an accelerometer 62 and a camera 64.

In an exemplary embodiment, the retail item 58 is a bag of potato chips, and the bar code 60 is located on the bag. In several exemplary embodiments, the system 54 may be located on the airplane 12.

Figure 3C:
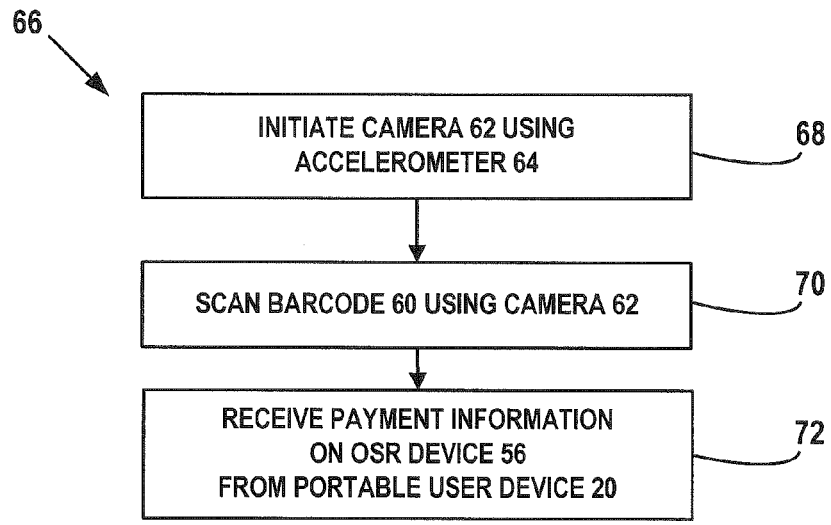
FIG. 3C is a flow chart illustration of a method of operating the system of FIG. 3A, according to an exemplary embodiment.

In an exemplary embodiment, as illustrated in FIG. 3C with continuing reference to FIGS. 1A, 1B, 1C, 1D, 2A, 2B, 3A and 3B, a method of operating the system 54 is generally referred to by the reference numeral 66. The method 66 is carried out in response to the user/passenger's desire to purchase the retail item 58. The method 66 includes at step 68 initiating the camera 64 using the accelerometer 62. In an exemplary embodiment, to initiate the camera 64 at the step 68, the OSR device 56 is shaken by, for example, a flight attendant on the airplane 12. At step 70, the barcode 60 is scanned or read using the camera 64, thereby identifying the retail item 58. At step 72, payment information, such as credit card information or debit card information, is received on the OSR device 56 from the portable user device 20. Thus, the user/passenger completes the purchase of the retail item 58.

In an exemplary embodiment, to receive the payment at the step 72, the OSR device 56 receives payment information from the portable user device 20 using indirect technology such as, for example, near field communication (NFC), Bluetooth, infrared, proximity inference via, for example, Global Positioning System (GPS) or triangulation, or other indirect technologies. In an exemplary embodiment, the user of the portable user device 20 is a passenger on the airplane 12, and carries the portable user device 20 onto the airplane 12. In an exemplary embodiment, at the step 72, the user "bumps" the portable user device 20 against the OSR device 56. As a result, the portable user device 20 and/or the OSR device 56 is detected, and authentication data is exchanged between the devices 56 and 20 to authenticate and activate a communication link therebetween, across which the payment information is received on the OSR device 56 from the portable user device 20. In an exemplary embodiment, at the step 72, the execution of the application 22 on the portable user device 20 permits the user to "bump" the portable user device 20 against the OSR device 56.

Figure 3D:
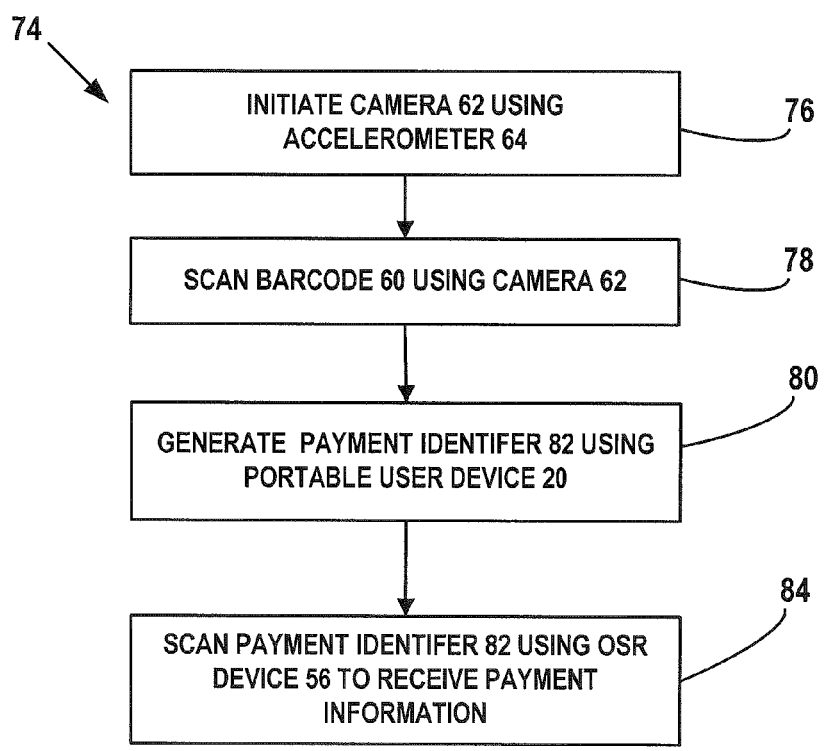
FIG. 3D is a flow chart illustration of a method of operating the system of FIG. 3A, according to another exemplary embodiment.

In an exemplary embodiment, as illustrated in FIG. 3D with continuing reference to FIGS. 1A, 1B, 1C, 1D, 2A, 2B, 3A, 3B and 3C, a method of operating the system 54 is generally referred to by the reference numeral 74 and includes steps 76 and 78, which are identical to the steps 68 and 70, respectively. At step 80, a payment identifier 82 (FIG. 3A) is generated using the portable user device 20. In an exemplary embodiment, the payment identifier 82 is a secure data matrix. At step 84, the payment information is received on the OSR device 56 from the portable user device 20. In an exemplary embodiment, to receive the payment information at the step 82, the payment identifier 82 is scanned or read using the camera 64 of the OSR device 56. In an exemplary embodiment, for security reasons and to reduce revenue loss from fraudulent credit cards, symmetrical keys with nonce are used for the generation of the payment identifier 82 at the step 80, as well as the identification of the payment identifier 82 at the step 84.

In several exemplary embodiments, the operation of the system 54, the execution of the method 66, or the execution of the method 74, optimizes the recording of sales and the acceptance or receipt of payment information for the OSR device 56 by, among other things, providing "touch-free" and "stylus-free" sales recording. That is, flight attendants on the airplane 12 do not have to enter information into the OSR device 56 by touching the OSR device 56 or using a stylus, or by sliding credit or debit cards through card readers. As a result, the flight attendants on the airplane 12 are permitted to more quickly scan and sell different retail items to different passengers on the airplane 12. As a result, there is a faster capture of onboard sales, and more convenience and options for capturing customer payment information.

In an exemplary embodiment, as illustrated in FIG. 4A with continuing reference to FIGS. 1A, 1B, 1C, 1D, 2A, 2B, 3A, 3B, 3C and 3D, a system is generally referred to by the reference numeral 86 and includes the computer server 14, the network 18, the portable user device 20, the application 22 (not shown), the NFC tag 34, the seat arm 36, the OSR device 56, the retail item 58, and the barcode 60. Although not shown in FIG. 4A, the system 86 further includes the airplane 12, in which the remainder of the components of the system 86 are located or positioned either permanently or temporarily.

Figure 4B:
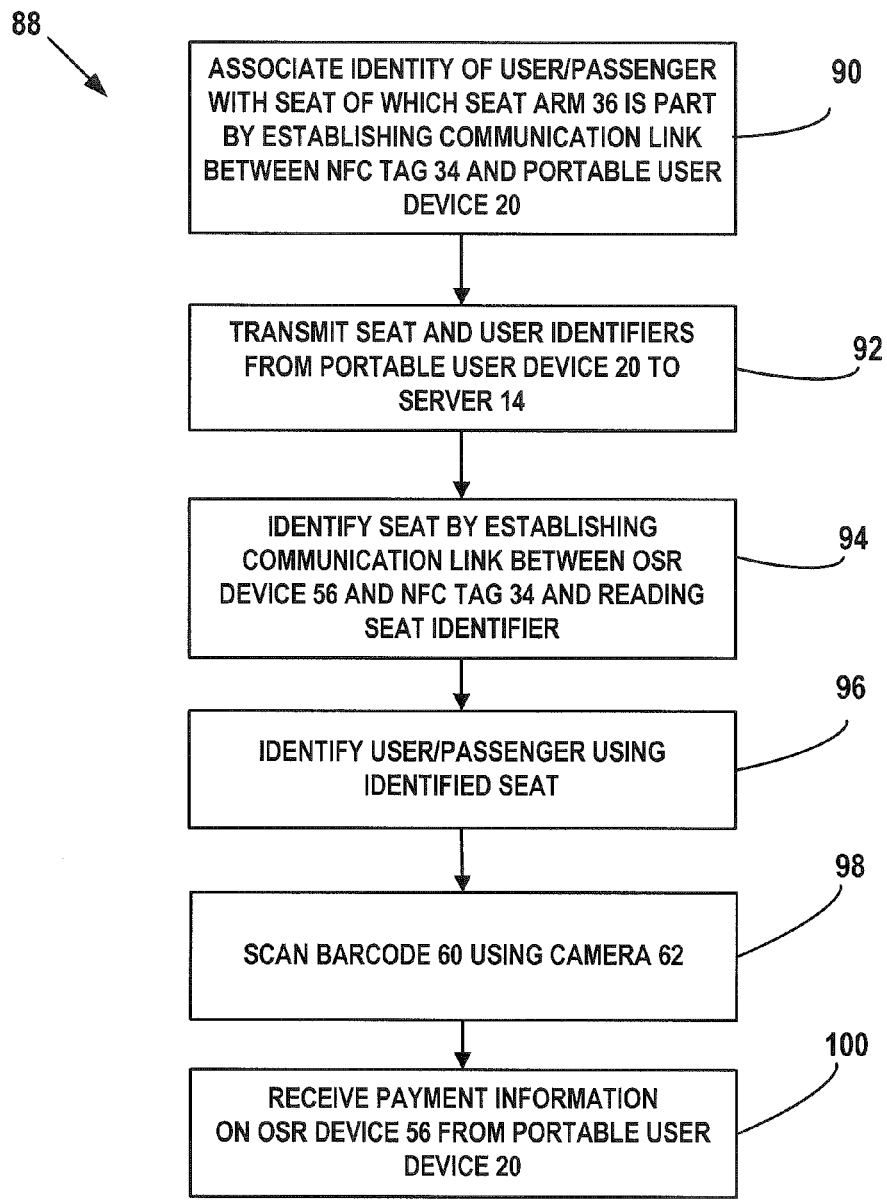
FIG. 4B is a flow chart illustration of a method of operating the system of FIG. 4A, according to an exemplary embodiment.

In an exemplary embodiment, as illustrated in FIG. 4B with continuing reference to FIGS. 1A, 1B, 1C, 1D, 2A, 2B, 3A, 3B, 3C, 3D and 4A, a method of operating the system 86 is generally referred to by the reference numeral 88. The method 88 is carried out in response to the user/passenger's desire to purchase the retail item 58.

The method 88 includes a step 90 at which the identity of the user of the portable user device 20 is associated with the seat of which the seat arm 36 is a part (in accordance with the above-described embodiments, the user of the portable user device 20 is a passenger on the airplane 12 who has been assigned the seat of which the seat arm 36 is a part). In an exemplary embodiment, at the step 90, to associate the identity of the user/passenger with the seat of which the seat arm 36 is a part, a communication link between the NFC tag 34 and the portable user device 20 is established, the seat identifier of the NFC tag 34 is read by the application 22, and the application 22 associates the seat identifier with the user identifier that is already stored on the portable user device 20.

In an exemplary embodiment, at the step 90, the application 22 is opened, executed, run or otherwise started up on the portable user device 20. The application 22 is then used to establish a communication link between the NFC tag 34 and the portable user device 20 by placing the portable user device 20 in relatively close physical proximity to the NFC tag 34, and to read the seat identifier of the NFC tag 34. The application 22 associates the seat identifier with the user identifier that is already stored on the portable user device 20, thereby associating the identity of the user/passenger with the seat of which the seat arm 36 is a part. In an exemplary embodiment, at the step 90, the user takes his or her seat on the airplane 12, and "bumps" the portable user device 20 against the NFC tag 34.

At step 92, the seat identifier read by the application 22 at the step 90 is transmitted from the portable user device 20 to the computer server 14 via the network 18. Additionally, at the step 44, the user identifier is transmitted from the portable user device 20 to the computer server 14 via the network 18. In several exemplary embodiments, the application 22 operates to transmit the seat and user identifiers to the computer server 14; the application 22 may operate to transmit additional identifiers to the computer server 14. The computer server 14 stores the identifiers transmitted at the step 92.

At step 94, a communication link between the OSR device 56 and the NFC tag 34 is established and the OSR device 56 reads the seat identifier of the NFC tag 34, thereby identifying the seat of which the seat arm 36 is a part.

At step 96, the user/passenger is identified using the seat identified at the step 94. In an exemplary embodiment, the OSR device 56 communicates with the computer server 14 via the network 18 to correlate the seat identified at the step 94 with the user and seat identifiers transmitted to the computer server 14 at the step 92.

Alternatively, in an exemplary embodiment, the step 94 may be omitted, and at the step 96 the user/passenger's seat may be identified by manually inputting the seat number into the OSR device 56. The OSR device 56 communicates with the computer server 14 via the network 18 to correlate the seat number with the user and seat identifiers transmitted to the computer server 14 at the step 92.

At step 98, the barcode 60 is scanned or read using the camera 64, thereby identifying the retail item 58.

At step 100, payment information, such as credit card information or debit card information, is received on the OSR device 56 from the portable user device 20. Thus, the user/passenger completes the purchase of the retail item 58.

In an exemplary embodiment, at the step 100, the OSR device 56 receives payment information from the portable user device 20 via the computer server 14 and the network 18. The payment information may be transmitted from the portable user device 20 to the computer server 14 via the network 18, and then may be transmitted from the computer server 14 to the OSR device 56 via the network 18. In an exemplary embodiment, the payment information may be transmitted to the computer server 14 along with the seat and user identifiers at the step 92, and the computer server 14 may store the payment information and seat and user identifiers.

Alternatively, in an exemplary embodiment, to receive the payment at the step 100, the OSR device 56 receives payment information from the portable user device 20 using indirect technology such as, for example, near field communication (NFC), Bluetooth, infrared, proximity inference via, for example, Global Positioning System (GPS) or triangulation, or other indirect technologies. In an exemplary embodiment, at the step 72, the user/passenger "bumps" the portable user device 20 against the OSR device 56. As a result, the portable user device 20 and/or the OSR device 56 is detected, and data is exchanged between the devices 56 and 20 to authenticate and activate a communication link therebetween, across which the payment information is received on the OSR device 56 from the portable user device 20. In an exemplary embodiment, at the step 72, the execution of the application 22 on the portable user device 20 permits the user/passenger to "bump" the portable user device 20 against the OSR device 56.

In an exemplary embodiment, as illustrated in FIG. 5 with continuing reference to FIGS. 1A, 1B, 1C, 1D, 2A, 2B, 3A, 3B, 3C, 3D, 4A and 4B, a system is generally referred to by the reference numeral 102 and is a combination of the systems 32 and 86. In an exemplary embodiment, a method of operating the system 102 may be a combination in whole or in part of the methods 40 and 88. In an exemplary embodiment, a method of operating the system 102 may include all of the steps of the methods 40 and 88.

In an exemplary embodiment, the operation of any of the systems 54, 86 and 102, or the execution of any of the methods 66, 74 or 88, provides faster captures of onboard sales (sales while onboard the airplane 12), and more convenience and options for capturing user/passenger payments.

In several exemplary embodiments, the operation of any of the above-described systems, or the execution of any of the above-described methods, gives the user of the portable user device 20, who is a passenger on the airplane 12, a personalized onboard experience that effectively turns the airplane 12 into a personal jet. Several dimensions of personalization may be provided, including one or more of the following: meals, entertainment, merchandising, destination services, other information or entertainment services, etc. The above-described systems, and the above-described methods, provide interactions that leverage onboard devices and connectivity, along with predictive analysis and customer data, enabling a commercial airline to optimize flight service and increase merchandising revenues.

In several exemplary embodiments, the operation of any of above-described systems, or the execution of any of the above-described methods, occurs before, during or after the airplane 12 has traveled from a departure location to an arrival location, thereby completing a travel leg or airline flight.

Figure 6:
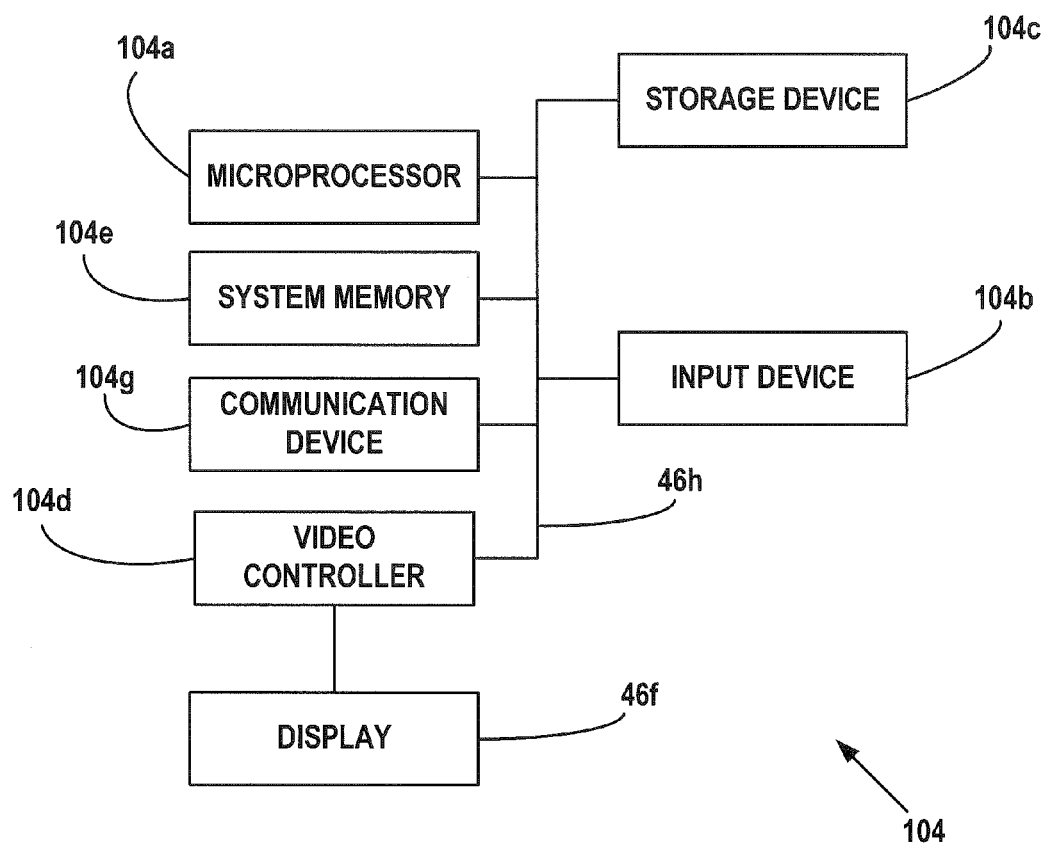
FIG. 6 is a diagrammatic illustration of a node for implementing one or more exemplary embodiments of the present disclosure, according to an exemplary embodiment.

In an exemplary embodiment, as illustrated in FIG. 6 with continuing reference to FIGS. 1A, 1B, 1C, 1D, 2A, 2B, 3A, 3B, 3C, 3D, 4A, 4B and 5, an illustrative node 104 for implementing one or more embodiments of one or more of the above-described networks, elements, methods and/or steps, and/or any combination thereof, is depicted. The node 104 includes a microprocessor 104a, an input device 104b, a storage device 104c, a video controller 104d, a system memory 104e, a display 104f, and a communication device 104g all interconnected by one or more buses 104h. In several exemplary embodiments, the storage device 104c may include a floppy drive, hard drive, CD-ROM, optical drive, any other form of storage device and/or any combination thereof. In several exemplary embodiments, the storage device 104c may include, and/or be capable of receiving, a floppy disk, CD-ROM, DVD-ROM, or any other form of computer-readable medium that may contain executable instructions. In several exemplary embodiments, the communication device 104g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the components of any of the above-described systems include at least the node 104 and/or components thereof, and/or one or more nodes that are substantially similar to the node 104 and/or components thereof. In several exemplary embodiments, one or more of the above-described components of the node 104 and/or the above-described systems include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, any networks and/or one or more portions thereof, may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a computer readable medium may be executed by one or more processors to cause the one or more processors to carry out or implement in whole or in part the above-described operation of each of the above-described systems, methods, and/or any combination thereof. In several exemplary embodiments, such a processor may include one or more of the microprocessor 104a, any processor(s) that are part of the components of the above-described systems, and/or any combination thereof, and such a computer readable medium may be distributed among one or more components of the above-described systems. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

A method has been described that includes locating a first electronic device and a computer server on a vehicle, the vehicle including a plurality of seats; operably coupling the first electronic device to the computer server so that the computer server is in communication with the first electronic device; permitting the establishment of a communication link between the first electronic device and a second electronic device that is located on the vehicle, wherein the second electronic device is associated with an identity of a user, wherein the second electronic device is adapted to be carried onto the vehicle by the user, and wherein permitting the establishment of the communication link includes: at least one of the following: detecting at least one of the first and second electronic devices using indirect technology; and receiving, on the first electronic device, a pattern that is unique to a combination of at least: one seat in the plurality of seats, the one seat being associated with the user of the second electronic device; and the identity of the user of the second electronic device; and authenticating and activating the communication link between the first and second electronic devices; transmitting data specific to the user from the computer server to the second electronic device; and permitting the transmission of personalized information or services between the first and second electronic devices. In an exemplary embodiment, the method includes permitting the second electronic device to remotely control the display of the personalized information or services on the first electronic device. In an exemplary embodiment, permitting the establishment of the communication link includes detecting the at least one of the first and second electronic devices; and wherein authenticating and activating the communication link includes exchanging authentication data between the first and second electronic devices. In an exemplary embodiment, permitting the establishment of the communication link includes generating the pattern that is unique to the combination of at least the one seat and the identity of the user; and wherein authenticating and activating the communication link includes authenticating and activating the communication link using the pattern. In an exemplary embodiment, the pattern is generated by the second electronic device; and wherein the pattern is scanned or otherwise read by the first electronic device so that the pattern is received by the first electronic device. In an exemplary embodiment, the vehicle is an airplane and the one seat is associated with an airline flight; and wherein the combination includes the one seat, the identity of the user, and the airline flight.

An apparatus has been described that includes a vehicle including a plurality of seats; a computer server located on the vehicle; a first electronic device located on the vehicle and in communication with the computer server; and a non-transitory computer readable medium having a plurality of instructions stored thereon and executable by one or more processors, the plurality of instructions including: instructions that cause the one or more processors to permit the establishment of a communication link between the first electronic device and a second electronic device that is located on the vehicle, wherein the second electronic device is associated with an identity of a user, wherein the second electronic device is adapted to be carried onto the vehicle by the user, and wherein instructions that cause the one or more processors to permit the establishment of the communication link include: at least one of the following: instructions that cause the one or more processors to detect at least one of the first and second electronic devices using indirect technology; and instructions that cause the one or more processors to receive, on the first electronic device, a pattern that is unique to a combination of at least: one seat in the plurality of seats, the one seat being associated with the user of the second electronic device; and the identity of the user of the second electronic device; and instructions that cause the one or more processors authenticate and activate the communication link between the first and second electronic devices; instructions that cause the one or more processors to transmit data specific to the user from the computer server to the second electronic device; and instructions that cause the one or more processors to permit the transmission of personalized information or services between the first and second electronic devices. In an exemplary embodiment, the plurality of instructions further includes instructions that cause the one or more processors to permit the second electronic device to remotely control the display of the personalized information or services on the first electronic device. In an exemplary embodiment, the instructions that cause the one or more processors to permit the establishment of the communication link include instructions that cause the one or more processors to detect the at least one of the first and second electronic devices; and wherein instructions that cause the one or more processors to authenticate and activate the communication link include instructions that cause the one or more processors to exchange authentication data between the first and second electronic devices. In an exemplary embodiment, the instructions that cause the one or more processors to permit the establishment of the communication link include instructions that cause the one or more processors to generate the pattern that is unique to the combination of at least the one seat and the identity of the user; and wherein instructions that cause the one or more processors to authenticate and activate the communication link include instructions that cause the one or more processors to authenticate and activate the communication link using the pattern. In an exemplary embodiment, the pattern is generated by the second electronic device; and wherein the pattern is scanned or otherwise read by the first electronic device so that the pattern is received by the first electronic device. In an exemplary embodiment, the vehicle is an airplane and the one seat is associated with an airline flight; and wherein the combination includes the one seat, the identity of the user, and the airline flight.

A method has been described that includes locating a data tag and a computer server on a vehicle, the vehicle including a plurality of seats; permitting the establishment of a communication link between the data tag and a first electronic device to identify one seat in the plurality of seats, wherein the first electronic device is located on the vehicle, wherein the first electronic device is associated with an identity of a user, and wherein the first electronic device is adapted to be carried onto the vehicle by the user; receiving, on the computer server, a seat identifier and a user identifier from the first electronic device, the seat identifier identifying the one seat, the user identifier identifying the user; locating a second electronic device on the vehicle; and transmitting, from the computer server to the second electronic device, instructions to authenticate and activate a communication link between the first and second electronic devices. In an exemplary embodiment, the method includes permitting the first electronic device to remotely control the display of personalized information or services on the second electronic device. In an exemplary embodiment, the first electronic device is permitted to remotely control the display of personalized information or services on the second electronic device via at least indirect technology. In an exemplary embodiment, the first electronic device is permitted to remotely control the display of personalized information or services on the second electronic device via at least the computer server. In an exemplary embodiment, the method includes controlling, using at least one of the first and second electronic devices, one or more of the following: overhead lighting above the one seat; one or more positions of the one seat; and an air nozzle above the one seat. In an exemplary embodiment, the method includes storing, using at least one of the first electronic device, the computer server and the second electronic device, control settings associated with one or more of the following: the overhead lighting above the one seat; the one or more positions of the one seat; and the air nozzle above the one seat. In an exemplary embodiment, the vehicle is an airplane and the one seat is associated with an airline flight; and wherein the method further includes receiving, on the computer server, a flight identifier from the first electronic device, the flight identifier identifying the airline flight.

An apparatus has been described that includes a vehicle including a plurality of seats; a computer server located on the vehicle; a first electronic device located on the vehicle and in communication with the first electronic device; a data tag located on the vehicle; and a non-transitory computer readable medium having a plurality of instructions stored thereon and executable by one or more processors, the plurality of instructions including instructions that cause the one or more processors to permit the establishment of a communication link between the data tag and a second electronic device to identify one seat in the plurality of seats, wherein the second electronic device is located on the vehicle, wherein the second electronic device is associated with an identity of a user, and wherein the second electronic device is adapted to be carried onto the vehicle by the user; instructions that cause the one or more processors to receive, on the computer server, a seat identifier and a user identifier from the second electronic device, the seat identifier identifying the one seat, the user identifier identifying the user; and instructions that cause the one or more processors to transmit, from the computer server to the first electronic device, instructions to authenticate and activate a communication link between the first and second electronic devices. In an exemplary embodiment, the plurality of instructions further includes instructions that cause the one or more processors to permit the second electronic device to remotely control the display of personalized information or services on the first electronic device. In an exemplary embodiment, the second electronic device is permitted to remotely control the display of personalized information or services on the first electronic device via at least indirect technology. In an exemplary embodiment, the second electronic device is permitted to remotely control the display of personalized information or services on the first electronic device via at least the computer server. In an exemplary embodiment, the plurality of instructions further includes instructions that cause the one or more processors to control, using at least one of the first and second electronic devices, one or more of the following: overhead lighting above the one seat; one or more positions of the one seat; and an air nozzle above the one seat. In an exemplary embodiment, the plurality of instructions further includes instructions that cause the one or more processors to store, using at least one of the second electronic device, the computer server and the first electronic device, control settings associated with one or more of the following: the overhead lighting above the one seat; the one or more positions of the one seat; and the air nozzle above the one seat. In an exemplary embodiment, the vehicle is an airplane and the one seat is associated with an airline flight; and wherein the plurality of instructions further include instructions that cause the one or more processors to receive, on the computer server, a flight identifier from the second electronic device, the flight identifier identifying the airline flight.

A method has been described that includes locating a retail item and a first electronic device on a vehicle, the retail item including a barcode, the first electronic device including a camera; scanning the bar code using the camera of the first electronic device; and receiving payment information on the first electronic device from a second electronic device that is located on the vehicle; wherein the second electronic device is adapted to be carried onto the vehicle by a user; and wherein receiving the payment information on the first electronic device includes at least one of the following receiving the payment information on the first electronic device using indirect technology; and receiving the payment information on the first electronic device using a payment identifier. In an exemplary embodiment, receiving the payment information on the first electronic device using indirect technology includes detecting at least one of the first and second electronic devices; and exchanging authentication data between the first and second electronic devices. In an exemplary embodiment, receiving the payment information on the first electronic device using the payment identifier includes generating the payment identifier on the second electronic device; and scanning the payment identifier using the camera of the first electronic device. In an exemplary embodiment, the payment identifier is a secure data matrix. In an exemplary embodiment, the vehicle is an airplane.

An apparatus has been described that includes a vehicle; a retail item located on the vehicle, the retail item including a barcode; a first electronic device located on the vehicle, the first electronic device including a camera; and a non-transitory computer readable medium having a plurality of instructions stored thereon and executable by one or more processors, the plurality of instructions including: instructions that cause the one or more processors to scan the bar code using the camera of the first electronic device; and instructions that cause the one or more processors to receive payment information on the first electronic device from a second electronic device that is located on the vehicle; wherein the second electronic device is adapted to be carried onto the vehicle by a user; and wherein the instructions that cause the one or more processors to receive the payment information on the first electronic device include at least one of the following: instructions that cause the one or more processors to receive the payment information on the first electronic device using indirect technology; and instructions that cause the one or more processors to receive the payment information on the first electronic device using a payment identifier. In an exemplary embodiment, the instructions that cause the one or more processors to receive the payment information on the first electronic device using indirect technology include instructions that cause the one or more processors to detect at least one of the first and second electronic devices; and instructions that cause the one or more processors to exchange authentication data between the first and second electronic devices. In an exemplary embodiment, the instructions that cause the one or more processors to receive the payment information on the first electronic device using the payment identifier includes instructions that cause the one or more processors to generate the payment identifier on the second electronic device; and instructions that cause the one or more processors to scan the payment identifier using the camera of the first electronic device. In an exemplary embodiment, the payment identifier is a secure data matrix. In an exemplary embodiment, the vehicle is an airplane.

A method has been described that includes locating a data tag and a computer server on a vehicle, the vehicle including a plurality of seats; permitting the establishment of a first communication link between the data tag and a first electronic device to identify one seat in the plurality of seats, wherein the first electronic device is located on the vehicle, wherein the first electronic device is associated with an identity of a user, and wherein the first electronic device is adapted to be carried onto the vehicle by the user; receiving, on the computer server, a seat identifier and a user identifier from the first electronic device, the seat identifier identifying the one seat, the user identifier identifying the user; locating a second electronic device on the vehicle, the second electronic device including a camera; permitting the establishment of a second communication link between the data tag and the second electronic device to identify the one seat with the second electronic device; determining the identity of the user using the seat identifier, the user identifier, and the identification of the one seat with the second electronic device; locating a retail item on the vehicle, the retail item including a barcode; scanning the bar code using the camera of the second electronic device; and receiving payment information on the second electronic device from the first electronic device. In an exemplary embodiment, the payment information is received on the second electronic device via the computer server. In an exemplary embodiment, the vehicle is an airplane.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping travel leg in which a ship travels from one port to one or more other ports. In an exemplary embodiment, aspects of the present disclosure are readily applicable and/or readily adaptable to a trucking travel leg during which a truck travels from one city to one or more other cities. In an exemplary embodiment, aspects of the present disclosure are readily applicable and/or readily adaptable to a rail travel leg during which a train travels from one city or station to one or more other cities or stations. In an exemplary embodiment, aspects of the present disclosure are applicable and/or readily adaptable to a wide variety of transportation transactions such as, for example, an airline sequence or itinerary (i.e., a plurality of airline flights), a travel leg of an airline sequence or itinerary (i.e., a single airline flight), an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

What is claimed is:

1. A method of personalizing an onboard experience of an airplane passenger, the method comprising:
    providing an airplane equipped with:
        a computer server;
        a network;
        a plurality of seats; and
        an NFC tag connected to one of the following:
            a portion of one seat in the plurality of seats;
            a tray proximate the one seat;
            a back of another seat that is positioned immediately in front of the one seat;
            a cabin wall above or proximate the one seat; and
            a cabin surface above or proximate the one seat;
    establishing a first communication link between the NFC tag and a first electronic device to identify the one seat in the plurality of seats, wherein the first electronic device is positioned on the airplane, wherein the first electronic device is associated with an identity of the airplane passenger, and wherein the first electronic device is adapted to be carried onto the airplane by the airplane passenger to thereby position the first electronic device on the airplane;
    receiving, on the computer server, a seat identifier and an airplane passenger identifier from the first electronic device, the seat identifier identifying the one seat, the airplane passenger identifier identifying the airplane passenger, wherein the seat identifier and the airplane passenger identifier are received on the computer server from the first electronic device via the network;
    storing, on the computer server, the seat identifier and the airplane passenger identifier received from the first electronic device via the network;
    positioning a second electronic device on the airplane;

establishing a second communication link between the NFC tag and the second electronic device;

identifying, via the second communication link, the one seat with the second electronic device;

determining the identity of the airplane passenger using the seat identifier, the airplane passenger identifier, and the identification of the one seat with the second electronic device, wherein determining the identity of the airplane passenger comprises correlating, using the second electronic device:

the one seat identified by the second electronic device via the second communication link, with the seat identifier and the airplane passenger identifier stored on the computer server, wherein, to correlate the one seat identified via the second communication link with the seat identifier and the user identifier stored on the computer server, the second electronic device determines the seat identifier and the airplane passenger identifier stored on the computer server by communicating with the computer server via the network;

positioning a retail item on the airplane, the retail item comprising a barcode;

reading the bar code using the second electronic device, thereby identifying the retail item; and receiving payment information on the second electronic device from the first electronic device;

receiving, on the computer server, personalized information regarding a plurality of cabin functions from the first electronic device via the network;

adjusting, using the computer server, any one of the plurality of cabin functions based on the personalized information, wherein the plurality of cabin functions comprise:

overhead lighting above the one seat;

one or more positions of the one seat; and an air nozzle above the one seat;

wherein the payment information is received on the second electronic device from the first electronic device via:

transmission of the payment information from the first electronic device to the computer server via the network; and transmission of the payment information from the computer server to the second electronic device via the network; and wherein receiving payment information on the second electronic device from the first electronic device and controlling, using the computer server, any one of the plurality of cabin functions personalizes the onboard experience of the airplane passenger.

2. The method of claim 1, wherein the network is an in-flight network.

3. The method of claim 1, wherein the second electronic device comprises a camera; and wherein reading the bar code using the second electronic device comprises scanning the bar code using the camera of the second electronic device.

* * * * *